United States Patent [19]
Hill et al.

[11] Patent Number: 5,992,897
[45] Date of Patent: Nov. 30, 1999

[54] JOINING LINED PIPE ITEMS

[75] Inventors: Tom Hill, Gateshead; Robert James Cummings, Morpeth, both of United Kingdom

[73] Assignee: BG plc, Reading, United Kingdom

[21] Appl. No.: 08/894,024

[22] PCT Filed: Feb. 22, 1996

[86] PCT No.: PCT/GB96/00411

§ 371 Date: Sep. 29, 1997

§ 102(e) Date: Sep. 29, 1997

[87] PCT Pub. No.: WO96/26384

PCT Pub. Date: Aug. 29, 1996

[30] Foreign Application Priority Data

Feb. 23, 1995 [GB] United Kingdom .................. 9503679
Nov. 20, 1995 [GB] United Kingdom .................. 9523726

[51] Int. Cl.$^6$ .................................................. F16L 9/14
[52] U.S. Cl. ............... 285/55; 285/288.1; 285/382.4; 29/890.14
[58] Field of Search .................. 285/55, 288.1, 285/382, 368, 382.4; 228/50, 138, 136, 120, 101; 29/890.14

[56] References Cited

U.S. PATENT DOCUMENTS

| | | |
|---|---|---|
| 2,216,839 | 10/1940 | Hoffman . |
| 3,046,114 | 6/1962 | Goodall ..................................... 285/55 |
| 4,611,833 | 9/1986 | Lescaut ..................................... 285/55 |
| 4,883,292 | 11/1989 | Kuroki . |
| 5,009,737 | 4/1991 | Lescaut ..................................... 285/55 |
| 5,326,137 | 7/1994 | Lorenz et al. ............................. 285/55 |
| 5,346,261 | 9/1994 | Abbema ..................................... 285/55 |
| 5,348,211 | 9/1994 | White et al. .............................. 285/55 |
| 5,566,984 | 10/1996 | Abbema et al. ........................... 285/55 |
| 5,590,914 | 1/1997 | Platner et al. ............................ 285/55 |

FOREIGN PATENT DOCUMENTS

| | | | |
|---|---|---|---|
| 869436 | 4/1971 | Canada .................................... 285/55 |
| 853 686 | 7/1949 | Germany . |
| 2010020 | 9/1970 | Germany ................................. 285/55 |
| 44-11754 | 5/1969 | Japan ....................................... 285/55 |
| 403932 | 8/1932 | United Kingdom . |
| 1001939 | 8/1965 | United Kingdom ..................... 285/55 |
| 1070952 | 6/1967 | United Kingdom . |
| 2 264 765 | 9/1993 | United Kingdom . |
| 1428 | 3/1987 | WIPO ...................................... 285/55 |
| WO 95/27166 | 10/1995 | WIPO . |

*Primary Examiner*—Eric K. Nicholson
*Attorney, Agent, or Firm*—Larson & Taylor

[57] ABSTRACT

Steel pipe items such as pipes (10) are each joined by a girth weld (14) to tubular steel fittings (12) and the pipes (10) are each lined by pulling a polyethylene liner (30) through the pipe (10) and through the fitting (12). A ring (32) is forced into each fitting (12) to compress the liner (30) and force it into grooves (20) in the internal surface of the fitting (12). The grooves (20) are separated by castellations (22). The grooves (20) are in a corrosion-resistant cladding (18) deposited on the interior of each fitting (12). Alternatively, the whole of each fitting (12) is made of corrosion-resistant Duplex steel. The ends of the liners (30) are cut short of the ends of the fittings (12) and an annulus 940) of liner material is inserted in the gap. The annulus (40) has an external groove (42) accommodating a body (44) of heat insulation material. The ends of the fitting (12) are joined by a girth weld (15).

15 Claims, 6 Drawing Sheets

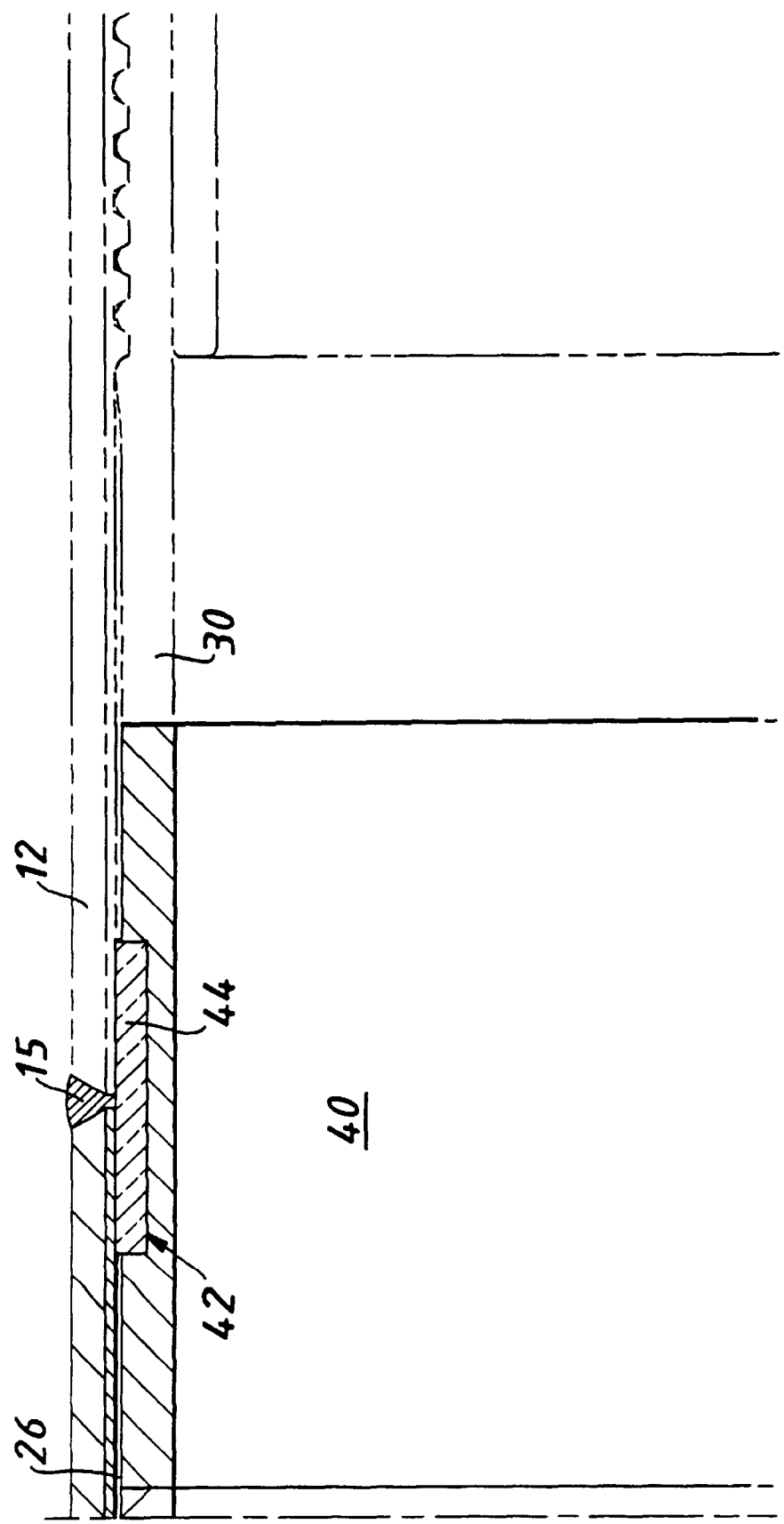

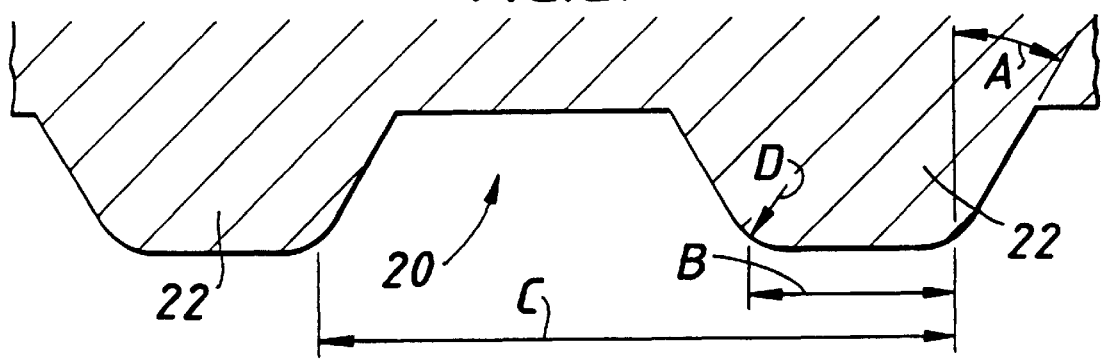
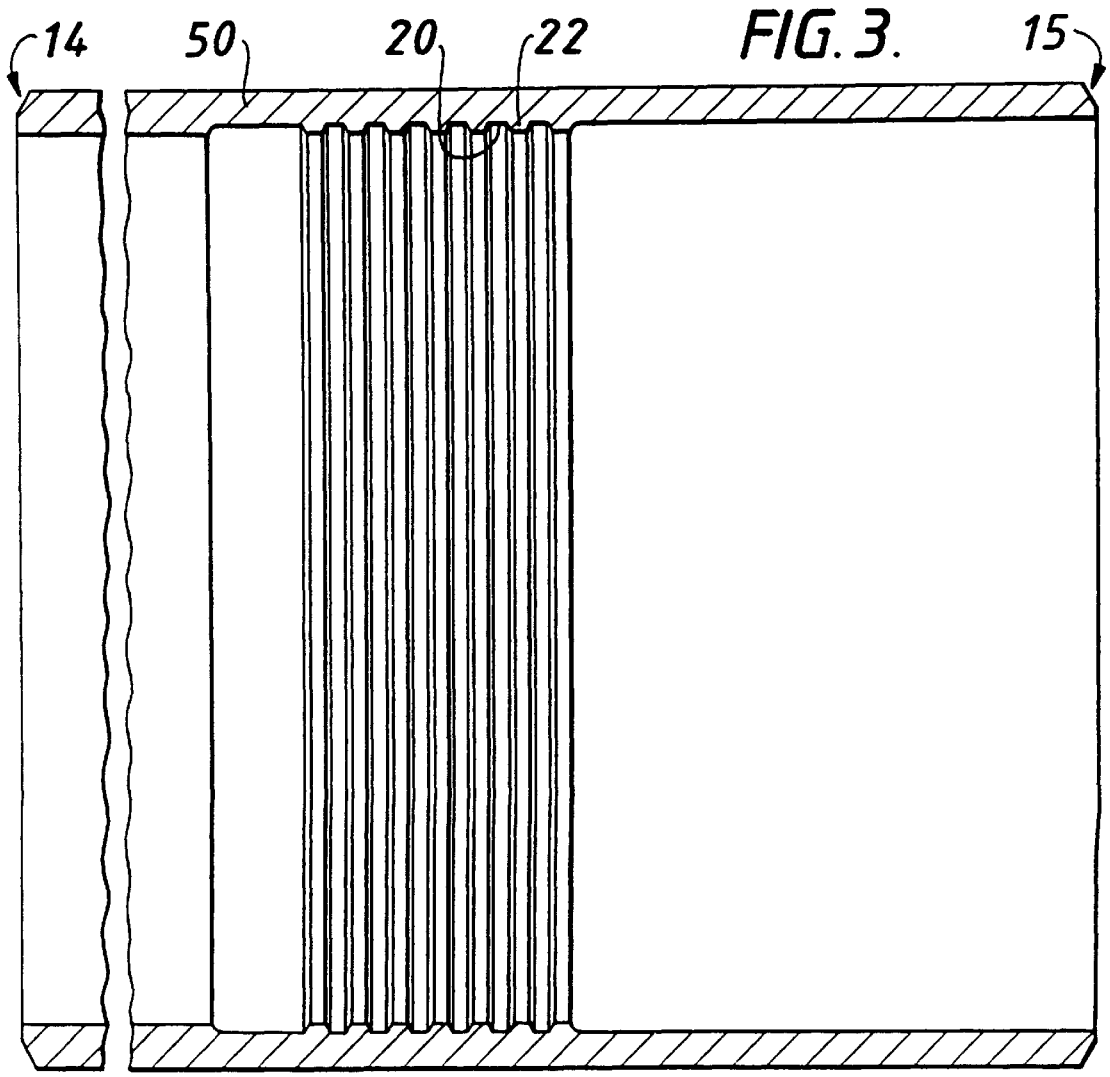

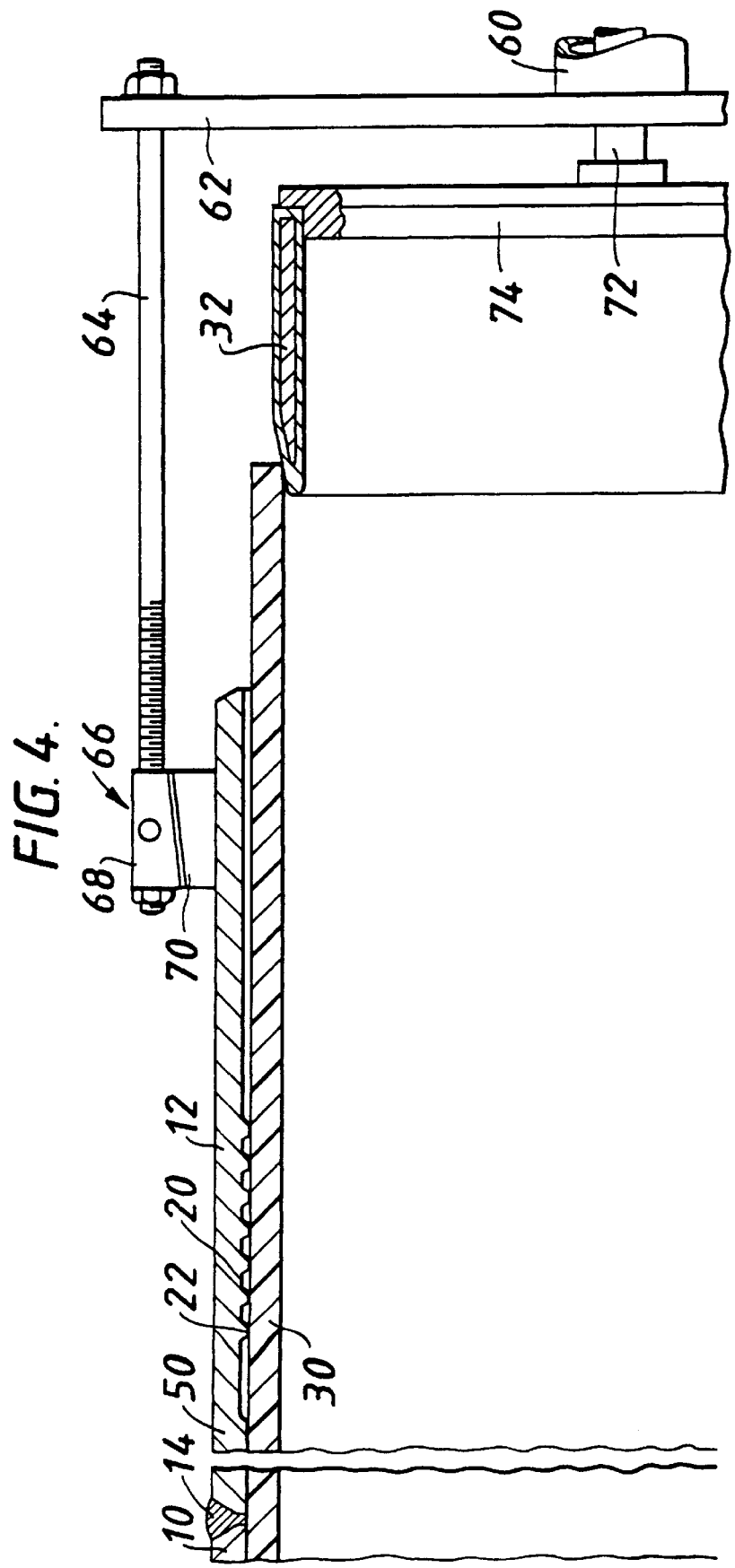

JOINING LINED PIPE ITEMS

The invention relates to joining lined pipe items, and to pipe fittings for use in such joining.

In particular the invention relates to joining pipes which have a lining, particularly a close-fit lining of polyethylene or other thermoplastic material. The pipes can be intended for use in conveying in particular for example liquid hydrocarbons containing carbon dioxide, hydrogen sulphide, methane or hydrocarbons. The liquid conveyed may be at a temperature of, for example, a value up to 160° C. and may be at a pressure of, for example, a value up to 5000 pounds per square inch. The liquid conveyed may include exclusively, or in conjunction with the hydrocarbons, nondeaerated water; or brine. In general, the pipes can be intended to convey liquids which have a very deleterious effect on the material normally used for pipes. That material is usually metal, for example ferrous metal which may be steel or cast-iron. The pipes therefore are fitted with a liner of thermoplastic material to reduce the effect of the liquid conveyed upon the pipe.

Such lined pipes have to be joined, at intervals, in order to allow a long pipeline to be built.

At the ends of such pipelines the pipeline includes other pipelike items, such as valves. In this specification the expression "pipe item" means pipes and other pipelike items such as valves, for example.

It is an object of the present invention to provide a method of joining two metal pipe items; two metal pipe items joined by the method; and a metal pipe fitting for use in such a method, in which a said pipe item or a pipe fitting may be formed of ferrous metal, for example steel or cast-iron.

U.S. Pat. No. 5,009,737 (Lescaut—assigned to Atochem) describes a method of producing a pipeline arrangement comprising positioning pipes end-to-end with an internal covering terminating axially inwardly of the axial ends to define an uncovered inner wall section situated between adjacent longitudinal ends of said coverings, welding the ends of the pipes together, introducing a strip of fusible material radially inside of said uncovered wall section, and heating the strip while applying radially outwardly directed pressure to the strip to push the strip against said uncovered wall section to reduce the thickness of the strip and increase the longitudinal width of the strip to cause the strip to contact the adjacent ends of the coverings and completely cover the uncovered wall section and to weld the strip to the coverings.

In the example described in U.S. Pat. No. 5,009,737 each of two adjoining pipes has a covering composed of polyamide thermoplastic material. Each pipe adjacent its end is free from covering. The two adjacent ends of the pipes are welded together.

The strip is also composed of polyamide thermoplastic material and has an initial thickness of 6 mm and is 80 mm wide. The pipes adjacent their ends are heated by an induction heating unit to a temperature of 200° C. while a pressure of 20 kPa is applied to the inner face of the strip. As soon as the temperature has reached 200° C. heating is interrupted and forced cooling is applied until the temperature falls to 100° C., when the pressure exerted on the strip is discontinued. As a result the strip is brought to a fused state and the strip is widened and the strip is welded to the ends of the coverings of the two pipes.

The pressure is applied to the strip by four blades movable radially by four hydraulic rams on a self-propelled carriage movable inside the pipes. This carriage is equipped with means for detecting the part of the pipes (in which the carriage is travelling) which is free from coverings. For example, a radioactive isotope may be provided or a mechanical feeler as the means.

Although the description mentions polyethylene as a covering material, it is not considered that U.S. Pat. No. 5,009,737 envisaged the use of a liner as a covering. A liner is a one-piece pipe-like member which is drawn into the steel pipe. By contrast, the covering described in U.S. Pat. No. 5,009,737 is a covering applied progressively to the pipe in particulate form. Alternative forms of covering are mentioned, including centrifuged cement and bitumens.

The methods described in U.S. Pat. No. 5,009,737 comprises welding the metal pipes together first of all followed by fusion welding of the strip to the coverings of the two pipes using a tool operating on the inside of the pipes.

U.S. Pat. No. 4,611,833 (Lescaut—assigned to Atochem) describes a pipeline internally coated with heat sensitive material to protect the interior of the pipe from corrosion or abrasion and comprising at least two pipe sections connected by a welded joint wherein the interior of each metal pipe is coated with a stainless metal alloy for a distance of from one-half to three pipes diameters from the end of the pipe and there is a reserved zone at the end of the pipe which is free of the heat sensitive material, the heat sensitive coating overlapping the stainless metal alloy coating for at least 20 millimeter from the end of the pipe, the edge of each section being coated with the stainless alloy and constituting the welded joint between the two pipe sections, the pipe sections being joined together by the bond formed by stainless alloy with the edges of the pipe and further bonded by an outer weld of metal which is of substantially the same metal as the metal comprising the pipe.

In this US patent, stainless ferrochromium alloy with a thickness of 500 microns is applied to the interior wall and edge of a 200 mm diameter pipe over a length of 120 mm measured from the end of the pipe. The covering is not a liner but is a covering composed of polyamide-11 deposited electrostatically to attain a thickness of 600 microns, leaving an uncoated reserve zone of 80 mm from the end of the pipe section.

The method described in U.S. Pat. No. 4,611,833 requires access over the whole length of each pipe to the interior surface of the pipe in order to apply the coverings to the interior surfaces of the pipes.

It is clear that the methods described in U.S. Pat. Nos. 5,009,737 and 4,611,833 are not applicable to joining pipe items in order to make a long pipeline of the kind described above. In particular in U.S. Pat. No. 5,009,737 the two steel pipes are first of all joined by welding. Then the joining of the liners of the two pipes requires the use of a machine operating on the inside of the pipes. It is apparent that there is a limit to the lengths of the pipes to enable that operation to be performed. The Applicants surmise that such operations could be performed only where each pipe was some 15 meters at most in length and the operation of joining the liner was performed each time a length of pipe was added to the preceding pipes.

Furthermore, the method described involves the use of an induction unit arranged around the pipes at each joint. Again, this presupposes that each joint is made every 15 m or less along the pipe.

U.S. Pat. No. 4,611,833 describes a process which requires internal deposition of a stainless metal coating at the end of each pipe followed by deposition by an electrostatic process or by dipping or rotary casting. Again, such a process requires the length of pipe to be limited to a length of 15 m or so. Joints therefore have to be made every 15 m in order to make a pipeline.

According to the invention, a method of joining two pipe items comprises joining to ends of each item a tubular metal fitting, each having an internal surface formed of corrosion resistant metal which extends to the free end of the fitting and the internal surface having grooves separated by castellations, lining the items with thermoplastic liners, forcing a respective ring of corrosion resistant metal into each fitting to compress the liner and force it into the grooves of the fitting and joining the fittings by welding.

Instead of using a respective ring which is forced into the fitting, an alternative method uses a respective undersize ring which is accommodated in each fitting and then the ring is forced outwardly so as to compress the liner and force it into the grooves of the fitting.

The fitting may have an external flange at its free end and, instead of joining the fittings by welding the fittings are joined by bolts passing through the flanges of the fittings.

One of the pipe items may itself be made of corrosion resistant metal and may have an external flange and the fitting and said one pipe item are joined by bolts passing through the flanges said one pipe item not containing a liner or a ring.

According to the invention a pipe fitting for use in the method comprises a length of corrosion resistant metal pipe the inside surface of which has grooves separated by castellations and a ring of corrosion resistant metal having a diameter less than the inside diameter of the length of pipe, the fitting being joined in use by welding to one of the pipe items, then the pipe item and the fitting are lined by a thermoplastic liner, then the ring is positioned within the liner opposite the grooves and forces the liner into the grooves, and the fitting is joined by welding to a similar fitting.

The fitting may have an integral, external flange the fitting being joined to a similar fitting or to another pipe item which has an integral, external flange by bolts passing through the flanges.

Alternatively, a pipe fitting according to the invention for use in the method comprises a length of metal pipe having an internal cladding of corrosion resistant metal, the cladding extending to a first end of the fitting, the inside surface of the cladding having grooves separated by castellations, and a ring of corrosion resistant metal having a diameter less than the inside diameter of the length of pipe, the fitting being joined at its end opposite to said first end in use to one of the pipe items, then the pipe item and the fitting are lined by a thermoplastic liner, then the ring is positioned within the liner opposite the grooves and forces the liner into the grooves, and the fitting is joined by welding to a similar fitting.

Such a fitting may have an integral, external flange having bolt holes and a working face which extends outwardly from said first end of the fitting and which is formed with an annular groove, said cladding extending over said face including said groove at which said cladding also provides an annular groove which, in use, partly accommodates an annular seal, which, in use, is compressible against a groove in the flange of a similar fitting or another pipe item by the action of bolts passed through the bolt holes of the two flanges.

The invention also includes two pipe items joined together by the method according to the invention.

When a said pipe item or a said pipe fitting is formed of cast-iron and has to be welded to further cast-iron or to some other weldable metal, the welding has to be carried out with some caution as is known in the cast-iron welding art.

Embodiments of methods of joining two pipe items will now be described by way of example with reference to the accompanying drawings in which:

FIGS. 1A and 1B are a longitudinal section through part of a first form of joint between two pipe items;

FIG. 2 is a scrap section, on an enlarged scale, showing the grooves and castellations shown in FIGS. 1A and 1B;

FIG. 3 is a vertical section through a fitting used in a second form of joint.

FIG. 4 is a longitudinal section through part of the fitting shown in FIG. 3 (this is shown merely by way of example, a fitting of the kind shown in FIG. 1A or 1B or in FIG. 7 could equally be used) joined to a pipe item and showing apparatus by which the ring is forced into the fitting;

Figure 1A:
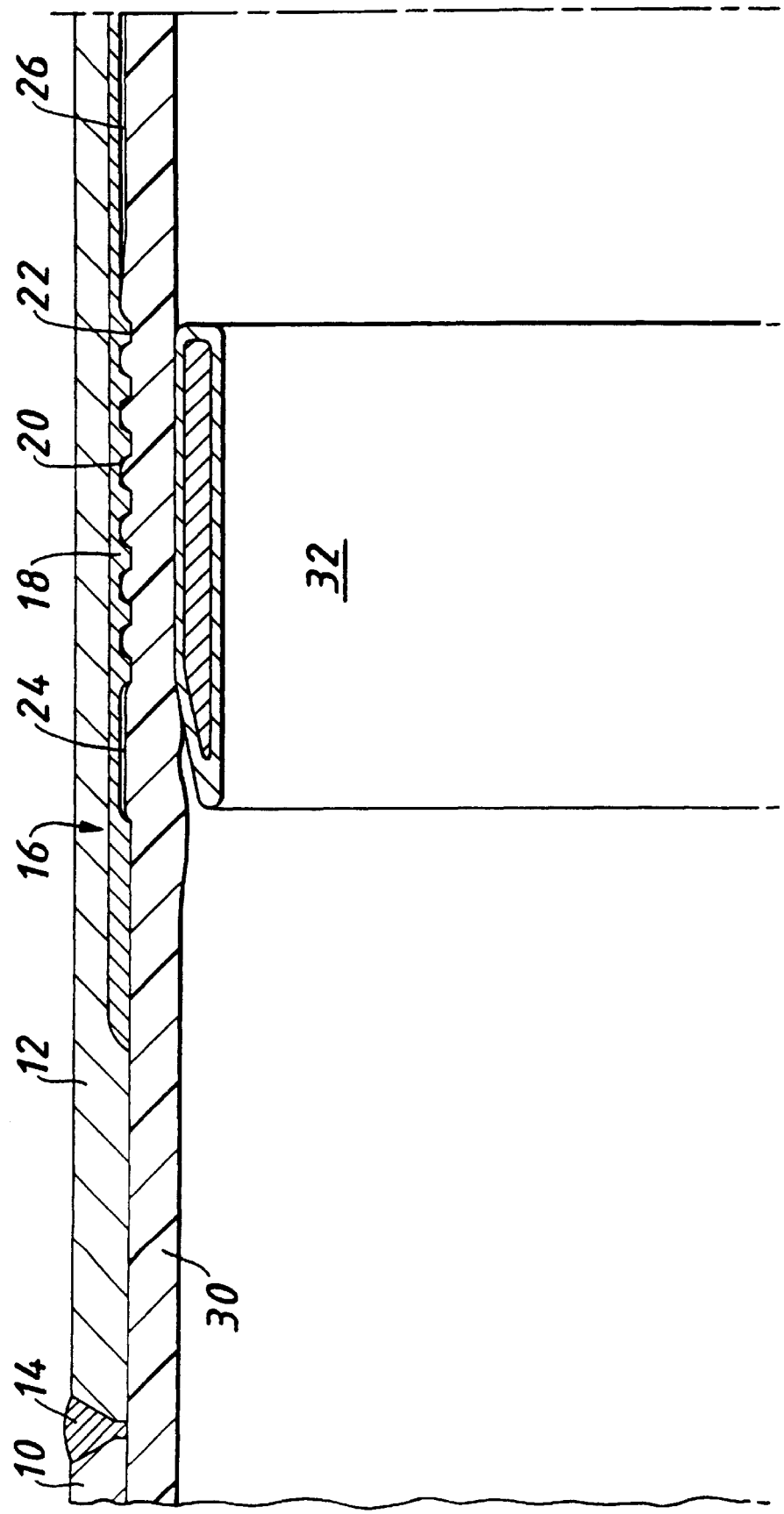

FIGS. 1A and 1B show one of two pipe items 10. Each item in this case is a steel pipe. The other pipe (not shown) is joined to a right hand end of a right-hand fitting shown in the figure and described below. The pipe 10, and the other pipe, is composed of carbon steel.

Each pipe 10 is joined to a tubular carbon steel fitting 12 by an annular girth weld 14. The two fittings 12 are joined by an annular girth weld 15.

The interior of each fitting 12 is relieved at 16 and corrosion resistant high alloy cladding material 18 is deposited as a weld deposit upon the fitting 12. The material is e.g. Inconel 625 weld deposit material. The internal surface of the material 18 is subsequently machined to form a series of internal, annular grooves 20 separated by internal, annular castellations 22.

Between the inner end of the relieved area 16 and the castellations 22 the internal surface of the material 18 is machined to provide a wider groove 24. Beyond the castellations 22 and right up to the end of the fitting 12 the internal surface of the material 18 is machined to provide a recess 26.

Each pipe 10 contains a tubular liner 30. In this example the liners 30 are composed of medium density polyethylene. The liners 30 are a close fit inside the pipes 10 and are installed by any method of installing close fit liners. The preferred method is the "Swagelining" process. "Swagelining" is a Trade Mark of British Gas plc. In this process the polyethylene liner is pulled through a die which reduces the diameter of the liner. Then the liner is pulled through the steel pipe. The liner is allowed to relax and after a period of time the liner reverts its original diameter and becomes a close fit in the pipe.

Each liner 30 is compressed in the region of the grooves 20 and castellations 22 by a ring 32, which can be of suitable metal, having a corrosion resistant external coating 33 formed for example of a cladding of Inconel 625 weld deposit material. In an alternative method, the ring 32 is entirely composed of stainless steel. Each ring 32 has been forced into the fitting 12 and forces the liner 30 into the grooves 20.

Each liner 30 terminates short of the end of the fitting 12 and an annulus 40 of liner material is accommodated in the gap between the ends of the two liners 30. The annulus 40 has an external annular groove 42 in which is received an annular body 44 of heat insulation material. The preferred material is obtainable from Burnstone Ceramic Limited of 19 Redgates, Walkington, Beverly, North Humberside HU17 8TS United Kingdom under the description Refractory Sheet Type A Moldable. The material comprises a mixture of aluminium oxide and alumino-silicate fibres with some 35–40% water which it loses when it dries, 1% of organic binder and a trace of ammonia. As received the material in the form of a rectangular strip is readily formed into an annular body 44 and the two ends pressed together. After shaping and moulding the ends of the strip, the strip can be heated to dry it after which a hard body 44 results.

The body 44 bridges the annular girth weld 15 between the fittings 12 and protects the underlying ring 40 of liner material.

The procedure for joining the two pipes 10 is as follows:

(a) the fittings 12 are joined by welding to the pipes;
(b) the pipes 10 are each lined using the "Swagelining" process by pulling a polyethylene liner 30 through a die and through the pipe 10 and the fitting 12. After a relaxation period of 24 hours the polyethylene liner 30 is cut slightly longer than the pipe and fitting;
(c) the compression ring 32 is forced into each fitting 12. The polyethylene liner 30 is compressed between say 10 and 20% and forced into the grooves 20 in the fitting 12 and against the castellations 22. Any surplus of polyethylene which is forced by insertion of the ring 32 into the fitting 12, in either case, is accommodated by the long groove 24 machined in the internal surface of the cladding material 18.
(d) the polyethylene liners 30 are cut to the final length leaving a length of each fitting 12 free of liner;
(e) the annulus of liner material 40 is positioned in one of the fittings 12 and the other fitting 12 is drawn over it;
(f) the two fittings 12 are joined by an annular girth weld 15. The process used is tungsten inert gas welding and a filler rod compatible with the cladding material 18 is used so that the weld is fully corrosion resistant and free of cracks. The insulation material 44 protects the ring 40 during welding.

FIG. 2 shows details of the grooves 20 and the castellations 22 in the fittings 12. In FIG. 2 the following are the values of the features listed:

| Feature | Value |
| --- | --- |
| Angle A | 30° |
| Width of castellation B | 3 millimeters |
| Pitch of castellation C | 9.3 millimeters |
| Radius on castellation D | 1.0 millimeters |

In the example described above the pipes 10 have an external diameter of 219.1 mm and an internal diameter of 200 mm. Each fitting 12 is 500 mm long.

In this example, the pipes 10 are each 0.5 to 1.0 kilometer in length. In making up a pipeline a typical requirement would be 2 or 3 joints between lined pipes in total. The advantage of the method according to the invention is that such a pipeline is fabricated using for the most part carbon steel which is much cheaper than using high alloy (Duplex) steel throughout or using corrosion inhibitors.

During operation of the pipeline made up using the method according to the invention for joining the pipes together, the corrosive product conveyed by the pipeline eventually permeates through the liner 30. A very small amount of corrosion then takes place at the inside surface of the steel pipe 10. However, after a period of time such corrosive action ceases because of a build-up of products of corrosion.

The corrosive product which reaches the internal surface of the cladding 18 on the fittings 12 does not cause any corrosion. Each liner 30 is compressed and forced against the cladding 18, so that there is no path for the corrosive product conveyed by the pipeline between the cladding 18 and the liner 30.

The use of the annulus 40 described above is optional. It is included because of the possibility that a pig will be used in the pipeline and when the pig traverses the gap between the end of the liners 30 (in the absence of the annulus 40) some damage might result to the pig. If pigging is known not to be required then the annulus 40 can be omitted.

FIG. 3 shows a modified form of fitting 50. The fitting 50 is entirely composed of Duplex stainless steel or other corrosion resistant metal.

Two fittings 50 are joined to the pipes 10 by welding instead of using the fittings 12. The welds at 14 are made using filler material which is compatible with the Duplex steel and the weld at 15 is made with a suitable filler material between the two Duplex fittings.

FIG. 4 shows the pipe 10 and the fitting 50 joined to it by welding 14. The liner 30 has already been inserted through the pipe 10 and the fitting 50.

The ring 32 has an outer diameter greater than the inner diameter of the liner 30. When the ring 32 reaches a position opposite to the grooves 20 in the fitting 50, the ring 32 compresses the liner 30 between itself and the castellations 22 and forces the liner 30 into the grooves 20.

The parts in FIG. 4 are shown in their positions immediately before the ring is inserted into the liner 30.

The ring 32 is forced into place using an hydraulic cylinder 60 which reacts against a plate 62 connected by tie rods 64 to a clamping assembly 66 arranged around the fitting 50. The assembly 66 includes wedges 68, connected to the tie rods 64, and reacting against inner wedges 70 and engaging the fitting 50. The piston rod 72 of the cylinder 60 acts on a loading plate 74 engaging the ring 32.

Silicone grease is smeared over the outside of the ring 32, which reduces friction and makes the insertion of the ring 32 into the liner 30 relatively easy and greatly reduces the force necessary to compress the liner 30 and force it into the grooves 20.

After the ring 32 has been forced into its final position opposite the grooves 20, the liner 30 is cut to its final length i.e. level with the free end of the fitting 50. If instead of the type of fitting 50, the type of fitting 12 shown in FIG. 1 were used, the liner 30 would be cut to its final length inside the fitting, as shown in FIG. 1.

Figure 5:
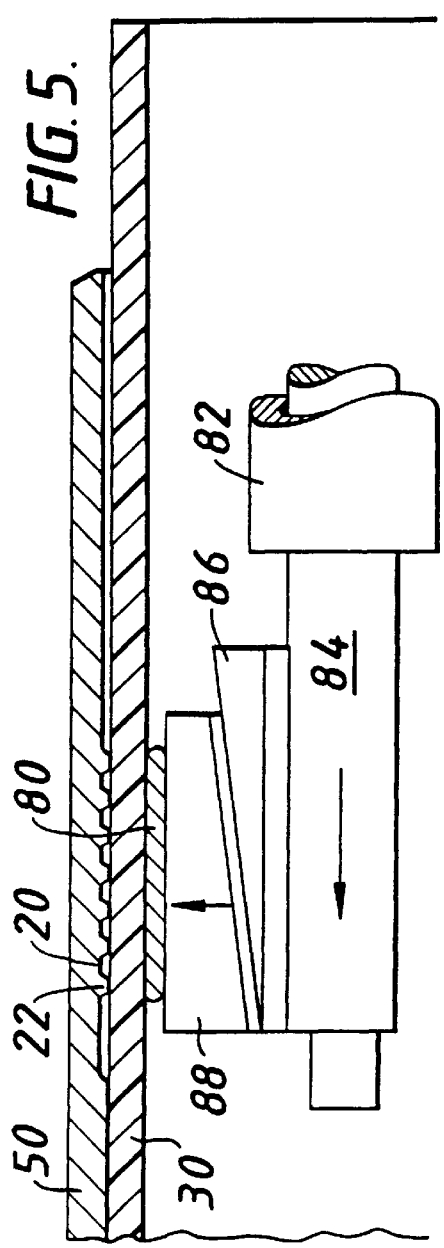
FIG. 5 is a longitudinal section corresponding to FIG. 4 but showing an alternative form of ring and apparatus by which the ring is expanded.

FIG. 5 shows an alternative form of ring used for compressing the liner 30 and forcing it into the grooves 20. In this case the ring 80 is initially of smaller outer diameter than the inner diameter of the liner 30. The parts are shown in FIG. 5 in the positions which they occupy immediately before the ring is expanded to compress the liner 30. The ring is placed in position opposite the grooves 20 and as hydraulic cylinder 82 is used to force the ring 80 outwardly. The ring 80 is strained beyond its elastic limit and compresses the liner 30 between itself and the castellations 22 of the fitting 50. The ring 80 is made of stainless steel or other corrosion resistant metal.

The cylinder 82 has a piston rod 84 connected to wedges 86 (only one of which is shown). The wedges 86 act on further wedges 88 (only one of which is shown). The wedges 88 act on the ring 80. When the piston rod 84 moves leftward (as viewed in the Figure) the wedges 88 are moved outwardly, which in turn forces the ring 80 outwardly beyond its elastic limit.

Figure 6:
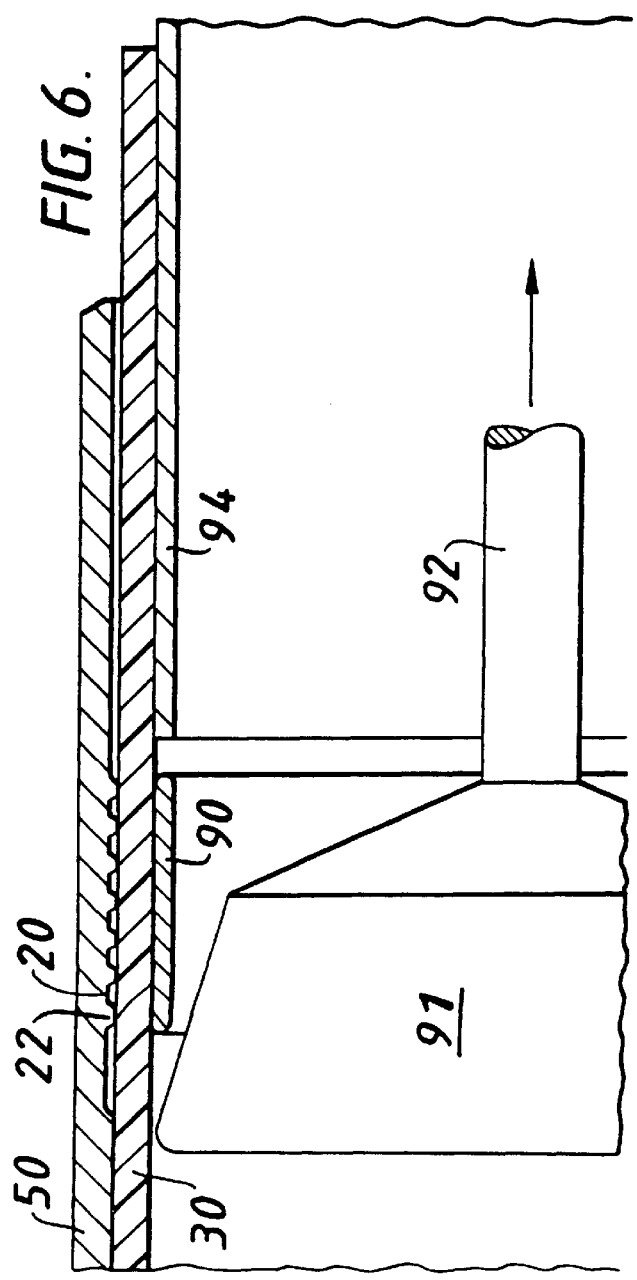
FIG. 6 is a longitudinal section corresponding to FIG. 5 but showing a further alternative of apparatus by which the ring is expanded.

FIG. 6 shows yet another alternative method of using a ring to force the liner 30 into the grooves 20 in the fitting 50.

The ring 90 is initially of smaller outer diameter than the inner diameter of the liner 30. In FIG. 6 the parts are shown immediately before the ring is expanded.

First of all a mandrel 91 is inserted in the liner 30. The extreme left-hand end (as viewed in FIG. 6) of the mandrel 91 has a diameter approximately equal to the inner diameter of the liner 30. The mandrel 91 is attached to a pull-rod 92 connected to an hydraulic cylinder (not shown).

Next, the ring 90 is placed in position opposite the grooves 20 and then a tubular steel member 94 of the same outer diameter as the ring 90, is positioned to the right of the ring 90 as viewed in the Figure. The member 94 is restrained against rightward movement.

Next, the hydraulic cylinder is operated to draw the mandrel 91 rightward (as viewed in FIG. 6) over the ring 90. The ring 90 is expanded outwardly past its elastic limit. The thickness of the ring 90 is chosen so that, when it has been expanded by the mandrel 91, it compresses the liner 30 between itself and the castellations 22 and forces the liner 30 into the grooves 20.

After the mandrel 91 has expanded the ring 90, the member 94 is removed from the liner 30 and then the mandrel 91 can be removed also from the liner 30.

Figure 7:
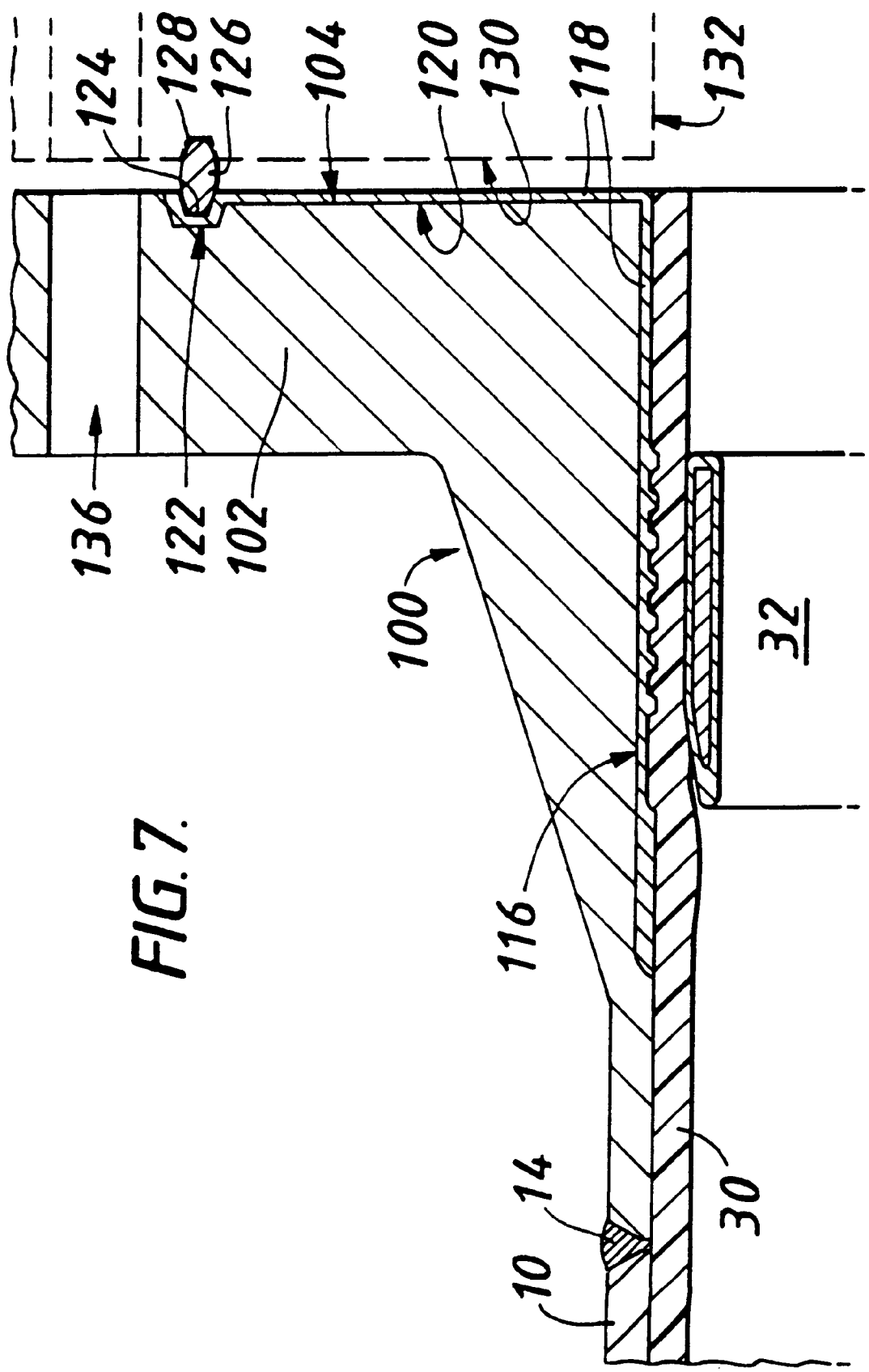
FIG. 7 is a section corresponding to FIG. 1 but showing an alternative form of fitting having an external flange.

FIG. 7 shows a modified form of fitting which can be used where the pipe is required to be joined to some other pipelike item, such as a valve. In such a case joining is required to be by way of a bolted assembly instead of joining the parts by welding.

The fitting 100 in this case has an integral, external flange 102 having a working face 104 which extends radially outwardly from the end of the fitting remote from the end which is welded at 14 to the pipe 10. The fitting 100 is relieved at 116 and corrosion resistant high alloy cladding material 118 is deposited as a weld deposit upon the fitting 100 over the area of relieving 116.

The fitting 100 is also relieved at 120 over the working face 120 including the formation of an annular groove 122. The cladding 118 is deposited in one contiguous layer not only over the area 116 but also the area of relieving 120 including the groove 122. The cladding 118 also forms an annular groove 124 over the groove 122.

The groove 124 partly accommodates a steel ring-type joint 126. This joint is also partly accommodated in a corresponding groove 128 in the working face 130 of the other pipe item 132. The other pipe item 132 may be identical with the fitting 100. Alternatively, the other pipe item 132 may be wholly made of corrosion resistant metal, such as stainless steel, for example.

The flange 102 has bolt holes 136 (only one of which is shown). The fitting 100 is joined to the other fitting 132, or to the other pipe item 132, by bolts (not shown) which are passed through the bolt holes 136 fitted with nuts (not shown) and drawn tight. The steel joint 126 is compressed between the flanges.

As a further alternative to the construction shown in FIG. 7, the whole of the fitting may be made of corrosion resistant metal (e.g. stainless steel for example). In that case, of course, no cladding would be used.

Although the fitting shown in FIG. 7 has been described as being used to join a pipe to some other kind of pipelike item, the fitting shown in FIG. 7 can, of course, be used to join two pipes.

Any of the methods described with reference to FIGS. 1, 4, 5, 6 and 7 for using a ring to force the liner into the grooves of the fitting can be used interchangeably as a matter of choice with the different fittings described herein.

In the above any of the pipe items 10, or fittings 12, 50 or 100 may be of cast-iron, and any welding involving such cast-iron articles will be performed in known manner appropriate to cast-iron.

We claim:

1. A method of joining two pipe items comprising joining to an end of each item a tubular metal fitting, each fitting having a free end and having an internal surface formed of corrosion resistant metal which extends to the free end of the fitting, said internal surface of said fitting having grooves separated by castellations, lining each of the pipe items and at least a portion of the fitting joined thereto with a thermoplastic liner, forcing a respective ring of corrosion resistant metal into the liner in each fitting to compress the liner and force it into the grooves of each fitting, and joining the fittings.

2. A method as claimed in claim 1 in which after each pipe item has been lined with said liner, the liner in each case is allowed to relax for a period of time, then a respective ring is forced into each fitting, and then the liner in each case is cut to a final length prior to inserting said ring into said liner.

3. A method as claimed in claim 1 in which each liner is cut within the fitting leaving a length of fitting unlined then, before the fittings are joined by welding, an annulus of liner material is placed within one fitting and extending from it, and the other fitting is drawn over the annulus, the annulus having an external groove which accommodates an annular body of insulation material which protects the underlying annulus of linear material when the fittings are subsequently joined by welding.

4. A method according to claim 1 in which instead of using a respective ring which is forced into the fitting a respective undersize ring is accommodated in each fitting and then the ring is forced outwardly so as to compress the liner and force it into the grooves of the fitting.

5. A method according to claim 1, in which each fitting has an external flange at its free end and in which instead of joining the fittings by welding, the fittings are joined by bolts passing through the flanges of the fittings, or one of the two pipe items is itself made of corrosion resistant metal and does not have a fitting and has an external flange and the fitting and said one pipe item are joined by bolts passing through the flanges, said one pipe item not containing a liner or a ring.

6. A pipe fitting for use in the method according to claim 1 comprising a length of corrosion resistant metal pipe the inside surface of which has grooves separated by castellations and a ring of corrosion resistant metal having a diameter less than the inside diameter of the length of pipe, the fitting being joined in use by welding to one of the pipe items, then the pipe item and the fitting are lined by a thermoplastic liner, then the ring is positioned within the liner opposite the grooves and forces the liner into the grooves, and the fitting is joined by welding to a further fitting.

7. A pipe fitting according to claim 6 in which the fitting has an integral, external flange, the fitting in use being joined to a further fitting, or to another pipe item which has an integral, external flange, by bolts passing through the flanges.

8. A pipe fitting for use in the method according to claim 1 comprising a length of metal pipe having an internal cladding of corrosion resistant metal, the cladding extending to a first end of the fitting, the inside surface of the cladding having grooves separated by castellations, and a ring of corrosion resistant metal having a diameter less than the inside diameter of the length of metal pipe, the fitting, in use, being joined at its end opposite to said first end to a pipe item, then the pipe item and the fitting are lined by a thermoplastic liner, then the ring is positioned within the liner opposite the grooves and forces the liner into the grooves, and the fitting is joined by welding to a further fitting.

9. A pipe fitting according to claim 8, in which the fitting has an integral, external flange having bolt holes and a working face which extends outwardly from said first end of the fitting and which is formed with an annular groove, said cladding extending over said face including said groove at which said cladding also provides an annular groove which, in use, partly accommodates an annular seal which, in use, is compressible against a groove in the flange of a further fitting or another pipe item by the action of bolts passed through the bolt holes of the two flanges.

10. Two pipe items joined together by the method according to claim 1 each being welded to a tubular metal fitting having an internal surface formed of corrosion resistant metal, said surface having internal grooves separated by castellations, and the two fittings being joined by welding and each containing a liner of thermoplastic material, each liner being compressed in each fitting by a respective ring of corrosion resistant metal, the liner in each case being forced into the grooves in the fitting.

11. Two pipe items according to claim 10, the two liners being separated by an annulus of liner material which has an external groove accommodating an annular body of insulation material which bridges the welded joint between the fittings.

12. A method according to claim 1 wherein the fittings are joined by welding.

13. A method of joining two pipe items comprising joining to an end of each item a tubular metal fitting, each fitting having a free end and having an internal surface formed of corrosion resistant metal which extends to the free end of the fitting, said internal surface of said fitting having grooves separated by castellations, lining each of the pipe items and at least a portion of the fitting joined thereto with a thermoplastic liner, positioning a respective undersize ring of corrosion resistant metal in the liner in each fitting, and forcing the undersize ring outwardly to compress the liner and force it into the grooves of each fitting, and joining the fittings.

14. A method of joining two pipe items comprising joining to an end of each item a tubular metal fitting, each fitting having a free end, an external flange at said free end, and having an internal surface formed of corrosion resistant metal which extends to the free end of the fitting, said internal surface of said fitting having grooves separated by castellations, lining each of the pipe items and at least a portion of the fitting joined thereto with a thermoplastic liner, forcing a respective ring of corrosion resistant metal into the liner in each fitting to compress the liner and force it into the grooves of the fitting, and joining the fittings by bolting through the flanges.

15. A method of joining two pipe items comprising joining to an end of a first pipe item a tubular metal fitting, said fitting having a free end, an external flange at said free end, and having an internal surface formed of corrosion resistant metal which extends to the free end of the fitting, said internal surface of said fitting having grooves separated by castellations, lining the first pipe item and at least a portion of said fitting joined thereto with a thermoplastic liner, forcing a respective ring of corrosion resistant metal into the liner in said first fitting to compress the liner and force it into the grooves of the fitting and joining the fitting to a second pipe item made of corrosion resistant metal and having an external flange by bolting through the external flange of said fitting and the flange of said second pipe item, said second pipe item not having a linear or a ring.

* * * * *